United States Patent
Tohana

(10) Patent No.: US 8,352,699 B2
(45) Date of Patent: Jan. 8, 2013

(54) HOST COMPUTER, MULTIPATH SYSTEM, PATH ALLOCATION METHOD, AND PROGRAM

(75) Inventor: Yasuhito Tohana, Tokyo (JP)

(73) Assignee: NEC Corporation, Tokyo (JP)

( * ) Notice: Subject to any disclaimer, the term of this patent is extended or adjusted under 35 U.S.C. 154(b) by 394 days.

(21) Appl. No.: 12/716,335

(22) Filed: Mar. 3, 2010

(65) Prior Publication Data

US 2010/0228942 A1   Sep. 9, 2010

(30) Foreign Application Priority Data

Mar. 6, 2009   (JP) ................................. 2009-052917

(51) Int. Cl.
*G06F 12/00* (2006.01)

(52) U.S. Cl. ........ 711/170; 711/152; 711/147; 711/114; 711/100; 711/103; 711/163; 711/164

(58) Field of Classification Search ................. 711/170, 711/152, 147, 114, 100, 103, 163, 164
See application file for complete search history.

(56) References Cited

U.S. PATENT DOCUMENTS

| | | | | |
|---|---|---|---|---|
| 7,318,129 B1 * | 1/2008 | Falik et al. | ..................... | 711/152 |
| 7,376,726 B2 * | 5/2008 | Yamashita et al. | ............ | 709/223 |
| 2006/0075198 A1 * | 4/2006 | Susaki et al. | .................. | 711/152 |

FOREIGN PATENT DOCUMENTS

| | | |
|---|---|---|
| JP | 2002533831 A | 10/2002 |
| JP | 2007157089 A | 6/2007 |
| JP | 2008257572 A | 10/2008 |

* cited by examiner

*Primary Examiner* — Midys Rojas

(57) ABSTRACT

Provided is a host computer which is connected to a system resource through n (n≧2) number of paths. The host computer includes: a plurality of logical partitions accessible to the system resource; an allocation unit that allocates the paths to the plurality of logical partitions; and an allocation table. The allocation table is user configurable and stores, in a correlated manner, information indicating the logical partitions and information capable of indicating the number of paths to be allocated to the logical partitions indicated by the information. The allocation unit allocates the paths to the logical partitions in accordance with the allocation table. This makes it possible to secure the I/O response also for logical partitions having a small amount of I/O.

18 Claims, 5 Drawing Sheets

274 ALLOCATION TABLE

| LOGICAL PARTITION | PATH ID | MINIMUM PATH NUMBER |
|---|---|---|
| 220 | 1, 2 | 2 |
| 230 | 3, 4, 5, 6 | 2 |
| 240 | 7, 8 | 2 |
| 250 | 9, 10, 11, 12 | 2 |

Fig. 3

HOST COMPUTER, MULTIPATH SYSTEM, PATH ALLOCATION METHOD, AND PROGRAM

INCORPORATION BY REFERENCE

This application is based upon and claims the benefit of priority from Japanese patent application No. 2009-052917, filed on Mar. 6, 2009, the disclosure of which is incorporated herein in its entirety by reference.

BACKGROUND OF THE INVENTION

1. Technical Field

The present invention relates to a path allocation technique for use in a multipath system.

2. Background Art

Various attempts have been made to improve the efficiency of computer systems that include a host computer and a system resource (e.g., storage device) used by the host computer.

For example, Japanese Unexamined Patent Application Publication No. 2008-257572 discloses a method for creating multiple logical partitions by logically partitioning storage devices, controlling the logical partitions so that each logical partition separately operates as an independent storage system, and changing the proportion allocated to each logical partition according to the amount of access from a host computer. With this method, the resource of a storage device, which is owned by a logical partition having a small amount of access, can be allocated to a logical partition having a large amount of access. As a result, the storage resource can be effectively used.

There has also been known a multipath system in which a host computer and a system resource are connected through multiple paths. According to the multipath system, path redundancy or distribution of an input/output (I/O) load is realized. Various methods for the construction and operation of such a multipath system have been proposed.

For example, Published Japanese Translation of PCT International Publication for Patent Application, No. 2002-533831 discloses a method for a multipath system employing multiple paths simultaneously. The method has been devised for allocating I/O operations for transmission/reception between a host computer and a system resource to any of the multiple paths. Specifically, according to this method, a time to complete the I/O operation currently being performed by each path is predicted, and a next I/O operation is allocated to the path which is expected to complete the I/O operation most quickly. This makes it possible to improve the usability of multiple paths and increase the efficiency of the entire system compared with the conventional round robin technique in which I/O operations are sequentially allocated to multiple paths.

Additionally, Japanese Unexamined Patent Application Publication No. 2007-157089 discloses a method for a multipath system including a path (regular path) for ordinary use and a path (sub path) used when a failure occurs in the regular path. According to the method, when a failure is detected in the regular path, the regular path is switched to the sub path and the regular path is blocked until the failure in the regular path is resolved.

If the regular path is not blocked during the time when a failure occurs in the regular path, the access from a host computer to a storage device is executed by the following procedure. That is, "the host computer accesses via the regular path", "the host computer cannot access the storage device because a failure occurs in the regular path", and "the regular path is switched to the sub path". According to the method disclosed in Japanese Unexamined Patent Application Publication No. 2007-157089, the failed regular path is blocked until the regular path is restored, and thus the host computer constantly "accesses the system resource via the sub path" during this period. This can improve the access efficiency during the period when a failure occurs in the regular path.

Moreover, there has also been known a multipath system in which a host computer having multiple logical partitions, which are configured for each of multiple operating systems (OSs), and a system resource are connected through multiple paths, and in which the multiple logical partitions share the system resource.

In the multipath system in which the host computer having multiple logical partitions and the system resource are connected through the multiple paths and in which the multiple logical partitions share the system resource, there is a fear that, when the multiple logical partitions have various amounts of I/O, processing in response to requests from logical partitions having a large amount of I/O accounts for a large portion of the processing of the entire system, and application processing in logical partitions having a small amount of I/O may be hindered.

SUMMARY

The present invention has been made in view of the above-mentioned circumstances, and provides a path allocation technique capable of securing the I/O response also for logical partitions having a small amount of I/O in a system as described above.

A first exemplary aspect of the present invention is a host computer which is connected to a system resource through n ($n \geq 2$) number of paths. The host computer includes: a plurality of logical partitions accessible to the system resource; an allocation table that is user configurable and stores, in a correlated manner, information indicating the logical partitions and information capable of indicating the number of paths to be allocated to the logical partitions indicated by the information; and an allocation unit that allocates the paths to the plurality of logical partitions in accordance with the allocation table.

Note that the host computer according to the first aspect of the present invention may be embodied as an apparatus, a method, a multipath system including the host computer, and a program for causing a computer to execute path allocation processing performed by the host computer, for example, which are also effective as an embodiment of the present invention.

BRIEF DESCRIPTION OF THE DRAWINGS

FIG. 3 is a table showing an example of an allocation table configured by a user;

EXEMPLARY EMBODIMENTS

Figure 1:
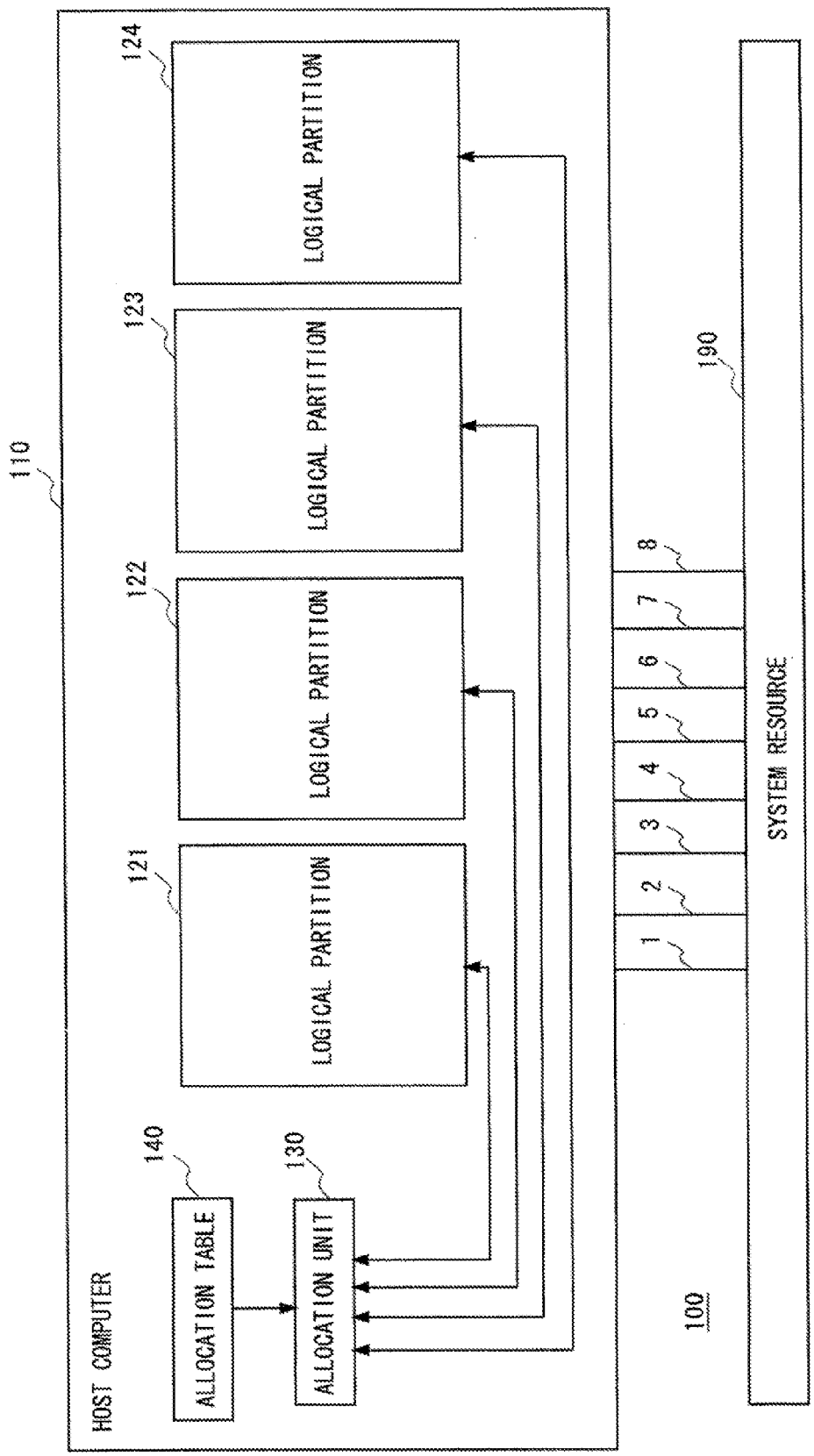
FIG. 1 is a schematic diagram of a multipath system illustrating the principle of a technique according to the present invention.

To clarify the explanation, omissions and simplifications are made as necessary in the following description and the drawings. Components having similar configurations or functions are denoted by the same reference numerals throughout the drawings.

Note that the elements illustrated in the drawings as functional blocks for performing various processings may be implemented hardwarewise by a CPU, a memory, and other circuits, and softwarewise by a program loaded into a memory or the like. Accordingly, it is understood by those skilled in the art that the functional blocks may be achieved in various forms including hardware alone, software alone, and combinations thereof, and not limited to any of them.

Prior to the description of exemplary embodiments of the present invention, the principle of a path allocation technique according to an exemplary embodiment of the present invention will now be described.

FIG. 1 shows a schematic diagram of a multipath system 100 illustrating the principle of the path allocation technique according to the present invention. The multipath system 100 includes a host computer 110, a system resource (e.g. storage device) 190 that is used by the host computer 110, and multiple, e.g., eight, paths (paths 1 to 8) that connect the host computer 110 and the system resource 190.

The host computer 110 includes multiple, e.g., four, logical partitions (logical partitions 121 to 124), an allocation unit 130 that allocates paths to the logical partitions 121 to 124, and an allocation table 140 that is user configurable.

The allocation table 140 is user configurable and stores, in a correlated manner, information indicating logical partitions and information capable of indicating the number of paths to be allocated to the logical partitions indicated by the information, for each of the logical partitions 121 to 124.

The allocation unit 130 allocates the paths to the logical partitions in accordance with the allocation table 140. Specifically, when an I/O request is issued from a logical partition, the allocation unit 130 refers to the allocation table 140 and allocates a number of paths corresponding to the logical partition.

That is, a number of paths corresponding to the number set by the user are allocated to the logical partitions of the host computer 110, regardless of the amount of I/O. Accordingly, even when the amount of access (the amount of I/O) from a certain logical partition to the system resource 190 is large, a set number of paths are allocated to a logical partition having a small amount of I/O. This avoids interruption of application processing in the logical partition.

According to the path allocation technique of the present invention, it is possible to secure the I/O response also for logical partitions having a small amount of I/O in the multipath system in which the host computer including multiple logical partitions and the system resource are connected through multiple paths and in which the multiple logical partitions share the system resource.

Exemplary embodiments of the present invention will now be described based on the above-mentioned principle.

First Exemplary Embodiment

Figure 2:
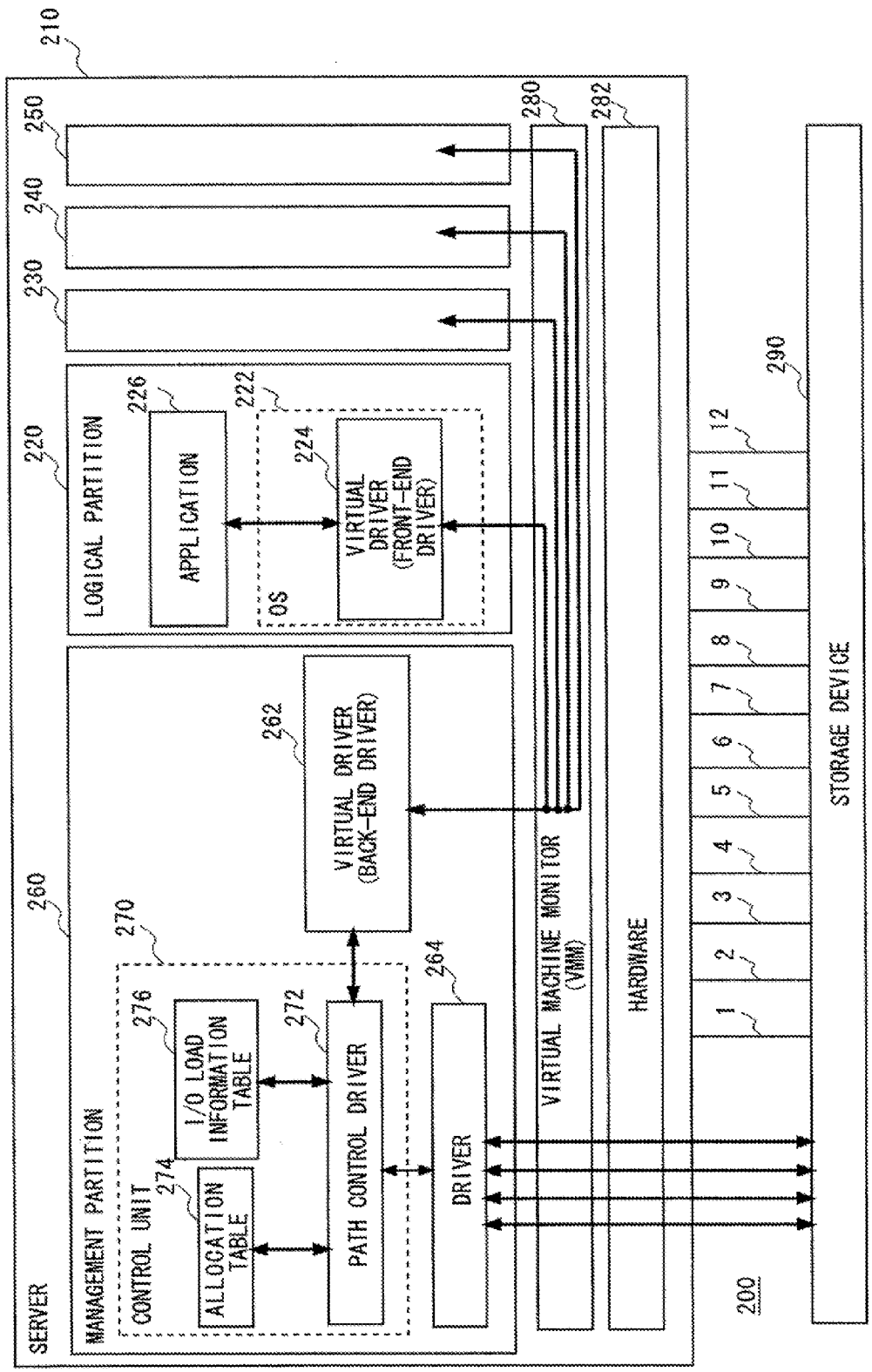
FIG. 2 is a diagram showing a multipath system according to a first exemplary embodiment of the present invention.

FIG. 2 shows a multipath system 200 according to a first exemplary embodiment of the present invention. The multipath system 200 includes a server 210, a storage device 290 that is used by the server 210, and multiple (e.g., 12) paths that connect the server 210 and the storage device 290.

The server 210 has a virtual environment implemented thereon, such as Hyper-V for Windows® or Xen for Linux®, and includes multiple (e.g., five) logical partitions configured for each OS. The logical partitions include logical partitions 220, 230, 240, and 250, and a management partition 260 that manages the four logical partitions. The server 210 also includes a virtual machine monitor (VMM) 280 for realizing the virtual environment, and a hardware 282.

The logical partition 220 has an OS 222 and an application 226 implemented thereon. The OS 222 includes a virtual driver (front-end driver) 224 for realizing the virtual environment. Each of the logical partition 230, the logical partition 240, and the logical partition 250 has an OS and application (not shown) implemented thereon in the same manner as the logical partition 220, and a detailed description and illustration thereof are herein omitted.

The management partition 260 has a management OS implemented thereon, and includes a virtual driver (back-end driver) 262 for realizing the virtualization environment, a control unit 270, and a driver 264.

The components of the server 210, except the control unit 270, are similar to the corresponding components of a host computer having a virtual environment of the same type. Accordingly, only the control unit 270 will be described herein in detail.

The control unit 270 includes a path control driver 272, an allocation table 274, and an I/O load information table 276. The control unit 270 also has a function of the allocation unit 130 of the host computer 110 in the multipath system 100 shown in FIG. 1, a function for mapping the driver 264 and the virtual driver 262 by allocating paths 1 to 12 to the logical partitions 220 to 250, and a path redundancy function. Note that the term "redundancy function" refers to a function for reserving at least one of the multiple paths as a sub path and using, when a failure occurs in any of regular paths, the sub path in place of the regular path.

The allocation table 274 stores, in a correlated manner, information indicating logical partitions, information capable of indicating the number of paths to be allocated to the logical partitions indicated by the information, and the minimum number of paths to be allocated to the logical partitions, for each of the logical partitions 220 to 250. Note that the allocation table 274 is user configurable. In this exemplary embodiment, information indicating a path itself, e.g., a path ID, is used as the information capable of indicating the number of paths to be allocated to the logical partitions.

FIG. 3 shows an example of the allocation table 274 configured by the user when the logical partition 230 and the logical partition 250 have higher priority than the logical partition 220 and the logical partition 240. The term "priority" refers to a priority order for securing the I/O response of the logical partition.

Referring to FIG. 3, in the allocation table 274 configured by the user, two or more paths are allocated to the logical partitions. The number of paths correlated with the logical partition 230 and the logical partition 250 which have higher priority is greater than the number of paths correlated with the logical partition 220 and the logical partition which have lower priority. The minimum path number "2" is set to each logical partition. Among these pieces of information, the number of paths to be allocated to the logical partitions can be changed by the path control driver 272, and the minimum path number cannot be changed by the path control driver 272.

In this exemplary embodiment, the path control driver 272 allocates the paths to the logical partitions in accordance with the allocation table 274 until the allocation table 274 is updated. For example, when the current allocation table 274 is configured as shown in the example of FIG. 3, the path control driver 272 allocates the paths 1 and 2 (two paths) to the logical partition 220, the paths 3 to 6 (four paths) to the logical partition 230, the paths 7 and 8 (two paths) to the logical partition 240, and the paths 9 to 12 (four paths) to the logical partition 250.

Figure 4:
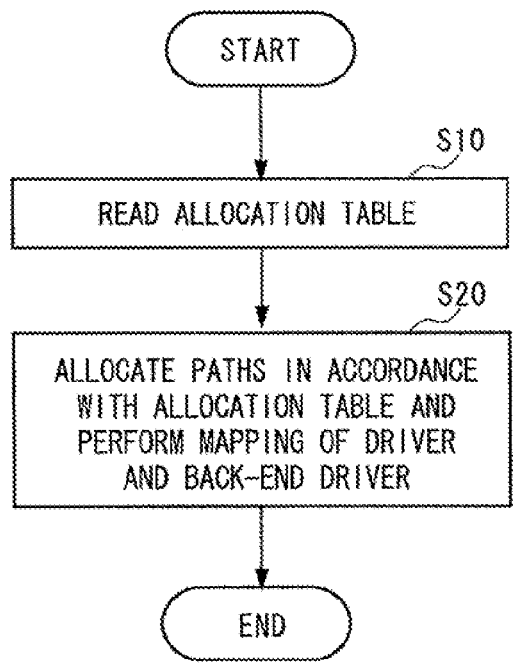
FIG. 4 is a flowchart showing path allocation processing performed by a path control driver in a server of the multipath system shown in FIG. 2.

FIG. 4 shows a flowchart of processing performed when the path control driver 272 allocates the paths to the logical partitions 220 to 250. When an I/O request is issued from any of the logical partitions, the path control driver 272 reads the allocation table 274 (S10) and allocates the paths, which are correlated with the logical partitions, in accordance with the allocation table 274, thereby performing mapping of the driver 264 and the virtual driver (S20).

In order to update the allocation table 274, the path control driver 272 samples the amount of I/O issued from each of the logical partitions and stores it in the I/O load information table 276. As the I/O amount, load information such as the frequency of issuance of I/O from the logical partition, and the size of the issued I/O may be used, for example.

Further, the path control driver 272 updates the allocation table 274 according to the I/O amount of each logical partition, which is stored in the I/O load information table 276, at predetermined intervals, for example. Note that the path control driver 272 updates the allocation table 274 to satisfy two conditions given below.

1. A number of paths equal to or greater than the minimum path number, which is set to each of the logical partitions, are allocated to the logical partitions.
2. More paths are allocated to logical partitions having a larger amount of I/O.

Figure 5:
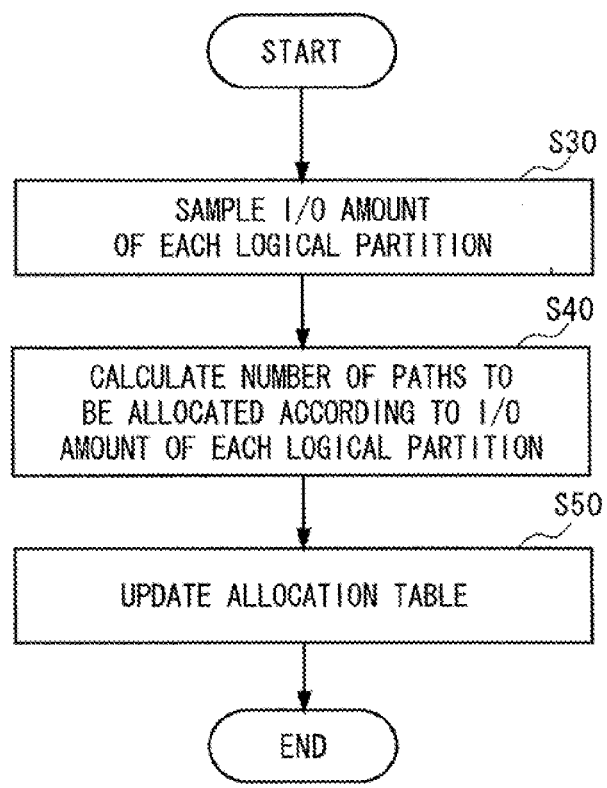
FIG. 5 is a flowchart showing allocation table update processing performed by the path control driver in the server of the multipath system shown in FIG. 2.

FIG. 5 is a flowchart showing processing for updating the allocation table 274 by the path control driver 272. Note that the update processing shown in FIG. 5 is executed at predetermined intervals.

The path control driver 272 samples the I/O amount of the logical partition 220 and stores it in the I/O load information table 276 (S30). In the update processing, I/O load information is read from the I/O load information table 276 to calculate the number of paths to be allocated to the logical partitions, and the path control driver 272 is updated based on the calculated path numbers (S40 and S50).

A description is herein given of an example of the processing executed in Step S40 by the path control driver 272, i.e., an algorithm for calculating the number of paths to be allocated to the logical partitions according to the I/O amount of each of the logical partitions.

First, according to Equation (1), the path control driver 272 calculates the number Pk of paths to be allocated to the logical partitions, based on the I/O amount Sk of each logical partition, which is stored in the I/O load information table 276, and on the minimum number minPi of paths to be allocated to the logical partitions, which is stored in the allocation table 274 and set by the user for each logical partition. In the case of the example shown in FIG. 3, the same minimum path number "2" is set as the minimum path number minPi to each of the logical partitions.

$$P_k = \left\lfloor n - \sum_{i=1}^{N} \min P_i \right\rfloor \times \frac{S_k}{S} \quad (1)$$

$P_k$: the number of paths to be allocated to a logical partition "k"
n: the total path number
N: the total number of logical partitions
min $P_i$: the minimum number of paths to be allocated to a partition "i"

$$S = \sum_{i=1}^{N} S_i : \text{the total amount of } I/O$$

$S_k$: the amount of I/O from the logical partition "k"
⌊ ⌋: a Gaussian symbol (rounded down)

The sum of path numbers Pk calculated according to Equation (1) does not necessarily correspond to the total number of paths. When the calculated path number Pk satisfies Equation (2), i.e., when no residual path is present, the path control driver 272 updates the allocation table 274 with the path number Pk calculated according to Equation (1) and allocates the paths to the logical partitions 220 to 250 in accordance with the allocation table 274 until a subsequent update.

$$n - \sum_{k=1}^{N} P_k = 0 \quad (2)$$

n: the total path number
$P_k$: the number of paths to be allocated to the logical partition "k"
N: the total number of logical partitions On the other hand, when the path number Pk calculated according to Equation (1) satisfies Equation (3), i.e., when residual paths are present, the path control driver 272 adds the residual paths one by one to the path number Pk of the logical partitions in descending order of the I/O amount of the logical partitions, and then updates the allocation table 274. After that, the paths are allocated to the logical partitions 220 to 250 in accordance with the allocation table 274 until a subsequent update.

$$0 < n - \sum_{k=1}^{N} P_k \leq N \quad (3)$$

n: the total path number
$P_k$: the number of paths to be allocated to the local partition "k"
N: the total number of local partitions The multipath system 200 according to this exemplary embodiment is an exemplary embodiment of the multipath system 100 shown in FIG. 1, and is capable of obtaining the same advantageous effects of the multipath system 100.

In the multipath system 200 according to this exemplary embodiment, the path control driver 272 is configured to allocate more paths to logical partitions having a larger amount of I/O, according to the I/O amount of each logical partition, on condition that the number of paths to be allocated to the logical partitions is equal to or greater than the minimum path number which is set by the user for each logical partition. This makes it possible to optimize the allocation of paths depending on the actual I/O state of each logical partition and to improve the I/O performance of the entire system, while securing the I/O response of each logical partition regardless of the I/O amount of each logical partition.

Second Exemplary Embodiment

The path allocation technique according to the present invention is also applicable to a multipath system including a server having a virtual environment of a guest OS/host OS type implemented thereon. This case will be described with reference to FIG. 6.

Figure 6:
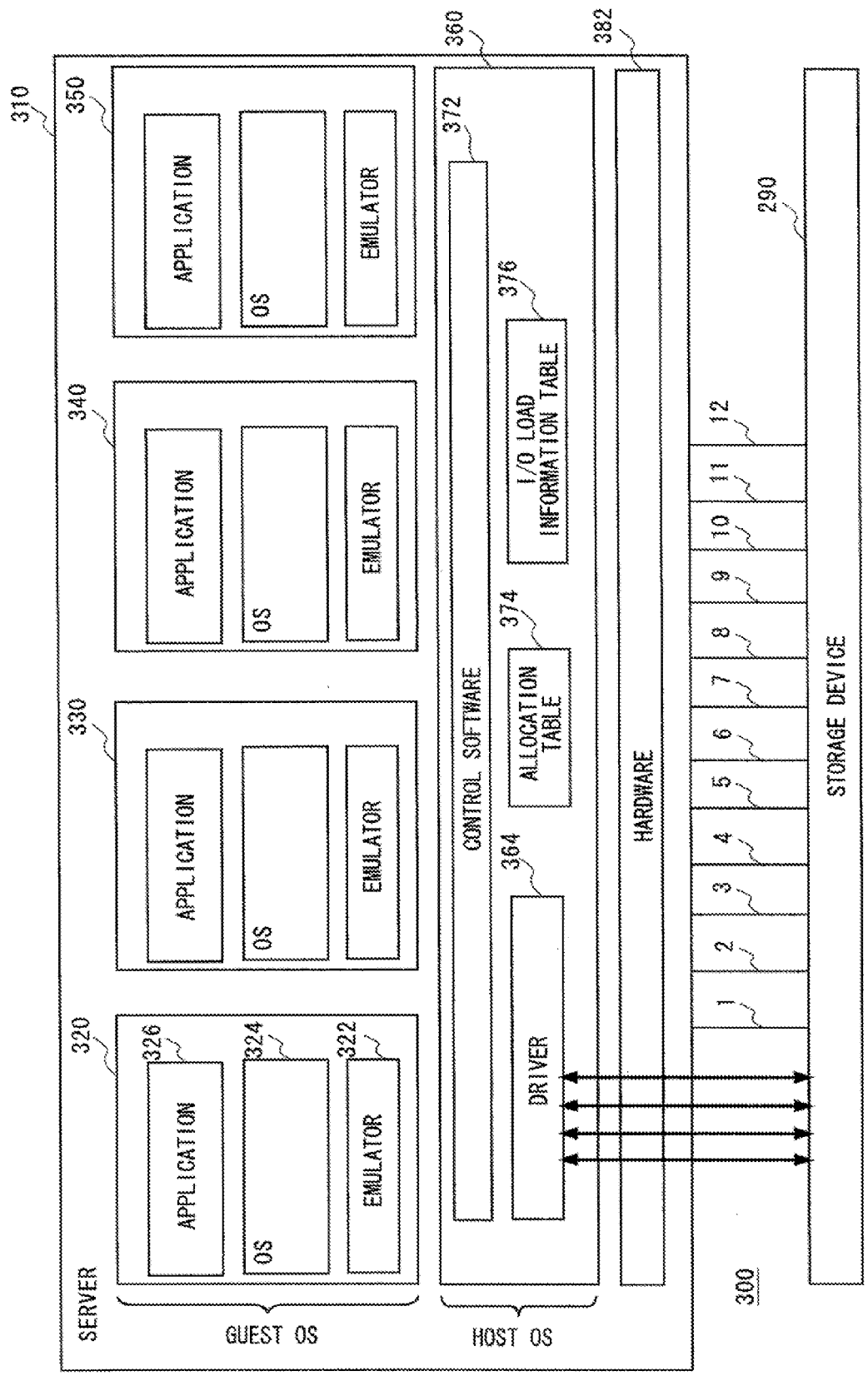
FIG. 6 is a diagram showing a multipath system according to a second exemplary embodiment of the present invention.

FIG. 6 shows a multipath system 300 according to a second exemplary embodiment of the present invention. The multipath system 300 includes a server 310, a storage device 290 that is used by the server 310, and multiple (e.g., 12) paths that connect the server 310 and the storage device 290.

The server 310 has a virtual environment of a guest OS/host OS type implemented thereon, and includes a host OS 360, multiple (e.g., four in this case) guest OSs 320 to 350, and a hardware 382.

The guest OS 320 has an emulator 322, an OS 324, and an application 326 implemented thereon. The guest OS 330, the guest OS 340, and the guest OS 350 have a configuration similar to that of the guest OS 320, and a detailed description and illustration thereof are herein omitted.

The host OS 360 includes a driver 364, a control software 372, an allocation table 374, and an I/O load information table 376.

The components of the server 310, except a part of the control software 372, the allocation table 374, and the I/O load information table 376, are similar to the corresponding components of a host computer having a virtual environment of the same type.

The control software 372 allocates the paths 1 to 12 to the guest OSs in accordance with the allocation table 374 and the I/O load information table 376. The allocation of paths is performed in the same manner as in the path control driver 272 of the multipath system 200. The allocation table 374 and the I/O load information table 376 are respectively similar to the allocation table 274 and the I/O load information table 276 of the multipath system 200.

That is, the technique according to the present invention is also applicable to the multipath system, like this exemplary embodiment, in which a server and a storage device are connected through multiple paths and the server has a virtual environment of a guest OS/host OS type.

Such application yields the same effects as those of the multipath system 200.

In the multipath system 200 shown in FIG. 2, the allocation table 274 is configured such that the minimum path number can be set to each logical partition by the user, and the path control driver 272 is configured to update the allocation table 274 on condition that the number of paths to be allocated to the logical partitions is equal to or greater than the minimum path number which is set for each logical partition. Alternatively, for example, the allocation table 274 may be configured such that only the number of paths to be allocated to the logical partitions can be set, and the path control driver 272 may be configured to allocate, when updating the allocation table 274, more paths to logical partitions having a larger amount of I/O, on condition that the number of paths to be allocated to the logical partitions is one or more (two when the path redundancy function is provided).

Also in this configuration, it is possible to optimize the allocation of paths depending on the actual I/O state of each logical partition and to improve the I/O performance of the entire system, while securing the I/O response of each logical partition regardless of the I/O amount of each logical partition.

As a matter of course, the allocation of paths may be performed in accordance with the allocation table 284, which is configured by the user, without updating the allocation table 274.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A host computer which is connected to a system resource through n (n≧2) number of paths, the host computer comprising:
   a plurality of logical partitions accessible to the system resource;
   an allocation table that is user configurable and stores, in a correlated manner, information indicating the logical partitions and information capable of indicating the number of paths to be allocated to the logical partitions indicated by the information;
   an allocation unit that allocates the paths to the plurality of logical partitions in accordance with the allocation table;
   a virtual environment of a guest OS/host OS type, wherein the plurality of logical partitions comprises a plurality of guest OSs, and
   the allocation unit is provided on a side of the host OS.

2. The host computer according to claim 1, wherein the allocation unit is configured to be able to change the allocation table on condition that at least m (1≦m≦n) number of paths are allocated to a single logical partition.

3. The host computer according to claim 2, wherein the allocation unit changes the allocation table so that more paths are allocated to logical partitions having a larger amount of access to the system resource.

4. The host computer according to claim 3, wherein
   the allocation table is configured to be able to set a minimum number of paths to be allocated to the logical partitions, and
   the allocation unit changes the allocation table on condition that the number of paths to be allocated to the logical partitions is not less than the minimum number set for the logical partitions.

5. The host computer according to claim 4, wherein the m is an integer equal to or greater than 2.

6. The host computer according to claim 2, wherein the m is an integer equal to or greater than 2.

7. A multipath system comprising:
   the host computer as claimed in claim 1;
   the system resource; and
   the n (n≧2) number of paths that connect the host computer and the system resource.

8. The multipath system according to claim 7, wherein the system resource comprises a storage device.

9. A path allocation method for allocating paths to a plurality of logical partitions accessible to a system resource, the plurality of logical partitions being included in a host computer connected to the system resource through n (n is an integer equal to or greater than 2) number of paths, the path allocation method comprising:
   performing the allocation, by an allocation unit of the host computer, in accordance with an allocation table of the host computer that is user configurable and stores, in a correlated manner, information indicating the logical partitions and information capable of indicating the number of paths to be allocated to the logical partitions indicated by the information, wherein the host computer includes a virtual environment of a guest OS/host OS type, the plurality of logical partitions comprises a plurality of guest OSs, and the allocation unit is provided on a side of the host OS.

10. The path allocation method according to claim 9, further comprising changing the allocation table on condition that at least m ($1 \leq m \leq n$) number of paths are allocated to a single logical partition.

11. The path allocation method according to claim 10, wherein the allocation table is changed so that more paths are allocated to logical partitions having a larger amount of access to the system resource.

12. The path allocation method according to claim 11, wherein the allocation table is configured to be able to set a minimum number of paths to be allocated to the logical partitions, and the allocation table is changed on condition that the number of paths to be allocated to the logical partitions is not less than the minimum number set for the logical partitions.

13. The path allocation method according to claim 11, wherein the m is an integer equal to or greater than 2.

14. The path allocation method according to claim 10, wherein the m is an integer equal to or greater than 2.

15. A program product for causing a computer to execute allocation processing for allocating paths to a plurality of logical partitions accessible to a system resource, the plurality of logical partitions being included in a host computer connected to the system resource through n (n is an integer equal to or greater than 2) number of paths, wherein the allocation processing comprises allocating paths, by an allocation unit of the host computer, in accordance with an allocation table of the host computer that is user configurable and stores, in a correlated manner, information indicating the logical partitions and information capable of indicating the number of paths to be allocated to the logical partitions indicated by the information, the host computer includes a virtual environment of a guest OS/host OS type, the plurality of logical partitions comprises a plurality of guest OSs, and the allocation unit is provided on a side of the host OS.

16. The program product according to claim 15, further causing the computer to execute change processing for changing the allocation table on condition that at least m ($1 \leq m \leq n$) number of paths are allocated to a single logical partition.

17. The program product according to claim 16, wherein the change processing comprises changing the allocation table so that more paths are allocated to logical partitions having a larger amount of access to the system resource.

18. The program product according to claim 17, wherein the allocation table is configured to be able to set a minimum number of paths to be allocated to the logical partitions, and the change processing comprises changing the allocation table on condition that the number of paths to be allocated to the logical partitions is not less than the minimum number set for the logical partitions.

* * * * *